(12) United States Patent
Shoyama

(10) Patent No.: US 6,508,286 B2
(45) Date of Patent: Jan. 21, 2003

(54) PNEUMATIC TIRES WHOSE BEAD CORE HAS A THICK-DIAMETER CORE WIRE AND A PLURALITY OF LAYERS OF THIN-DIAMETER SHEATH WIRES

(75) Inventor: Yoshinobu Shoyama, Higashiyamato (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/800,787

(22) Filed: Mar. 8, 2001

(65) Prior Publication Data

US 2001/0050127 A1 Dec. 13, 2001

Related U.S. Application Data

(62) Division of application No. 09/069,279, filed on Apr. 29, 1998, now Pat. No. 6,244,318.

(30) Foreign Application Priority Data

May 15, 1997 (JP) .............................. 9-141044

(51) Int. Cl.[7] .......................... B60C 15/00; B60C 15/04
(52) U.S. Cl. ...................................... 152/540; 152/539
(58) Field of Search ................................. 152/540, 539; 245/1.5; 57/902

(56) References Cited

U.S. PATENT DOCUMENTS

| | | | |
|---|---|---|---|
| 1,270,053 A | 6/1918 | Ream | 245/1.5 |
| 1,715,302 A | 5/1929 | Michelin | 245/1.5 |
| 3,736,974 A | 6/1973 | LeJeune | 152/540 |
| 4,781,016 A | 11/1988 | Sato et al. | 57/902 X |
| 4,887,655 A | 12/1989 | Imai et al. | 152/540 X |
| 5,327,713 A | 7/1994 | Sakon | |
| 5,676,777 A | 10/1997 | Watanabe | 152/540 |
| 5,697,204 A | 12/1997 | Kuriya | 57/902 X |

FOREIGN PATENT DOCUMENTS

| | | | |
|---|---|---|---|
| DE | 20 26 875 B2 | 1/1980 | 152/540 |
| DE | 35 35 673 | 4/1987 | |
| EP | 0707986 A2 | 4/1996 | |
| FR | 812 539 | 5/1937 | |
| GB | 2 080 845 A | 2/1982 | |
| JP | 53-51804 | 5/1978 | |
| JP | 6-211009 | 8/1994 | 152/540 |
| JP | 7-156617 | 6/1995 | |

*Primary Examiner*—Adrienne C. Johnstone
(74) *Attorney, Agent, or Firm*—Sughrue Mion, PLLC

(57) ABSTRACT

A pneumatic tire has a bead core consisting of a single core and plural sheath layers formed by helically winding plural sheath wires around the core, in which an end count of sheath wires in an outermost sheath layer is made smaller than an end count at a close-packed state or each sheath wire constituting a second sheath layer from an outermost side is covered with a coating rubber prior to the winding.

2 Claims, 4 Drawing Sheets

PNEUMATIC TIRES WHOSE BEAD CORE HAS A THICK-DIAMETER CORE WIRE AND A PLURALITY OF LAYERS OF THIN-DIAMETER SHEATH WIRES

This is a divisional of application Ser. No. 09/069,279 filed Apr. 29, 1998, now U.S. Pat. No. 6,244,318 the disclosure of which is incorporated herein by reference.

BACKGROUND OF THE INVENTION

1. Field of the Invention

This invention relates to a pneumatic tire having a bead core comprised of a core wire and plural sheath layers laminated therearound.

2. Description of Related Art

In general, a large stress is applied to a bead portion in a pneumatic tire used under a high speed and a heavy load, e.g. a pneumatic tire for an airplane during the running of the tire. Therefore, a bead core durable to such a large stress should be arranged in the bead portion.

As the bead core durable to the large stress, there has hitherto been known a bead core as disclosed in JP-A-53-51804 or so-called cable bead formed by helically winding plural thin-diameter wires around a single thick-diameter wire to form a sheath layer and laminating a plurality of such sheath layers one upon the other. In such a bead core, each of the sheath layers is formed by winding the sheath wires at a close-packed state so as to bear the above large stress. The term "close-packed state" used herein means a state that a maximum number of sheath wires are embedded in each of the sheath layers.

However, when the pneumatic tire having such a conventional bead core is used over a long time, there is a problem that fatigue breakage is caused in the sheath wires of a second sheath layer from an outermost side to lower bead portion durability as mentioned below. That is, since each of the sheath layers is constructed by winding the sheath wires at a close-packed state and the number of sheath wires embedded at the close-packed state is necessarily a positive integer, outer surfaces of adjoining sheath wires (bare wires) are not usually closed to each other, so that a slight gap is existent between the sheath wires (a sum of all gaps in one sheath layer is more than zero but is smaller than a diameter of one sheath wire). In the vulcanization of such a pneumatic tire, therefore, rubber disposed around the bead core flows into the inside of the bead core through a slight gap between adjoining sheath wires in a radial direction. For example, in case of the pneumatic tire for airplanes, rubber covers a full periphery of a sheath wire in an outermost sheath layer and flows inward into a second sheath layer from the outermost side in the radial direction through gaps between the sheath wires of the outermost sheath layer so as to cover about 10–20% of an outward portion of each sheath wire in the second sheath layer in the radial direction. For this end, in the conventional bead core, a greater part of adjoining sheath wires in the second sheath layer from the outermost side are opposite to each other at a bare state, while all adjoining sheath wires from a third and on sheath layers are opposite to each other at a bare state. At this state, when such a pneumatic tire is run at a high speed under a heavy load, a deformation quantity produced in each sheath layer (sheath wires) becomes larger as the sheath layer becomes near to the outermost side, so that the adjoining bared sheath wires in the second sheath layer directly contact with each other to strongly cause fretting and hence a large stress is repeatedly caused in the inside of the sheath wire in the second sheath layer to finally cause fatigue breakage. Although the deformation quantity produced in the outermost sheath layer is largest among the plural sheath layers, the full periphery of each sheath wire in the outermost sheath layer is covered with rubber as mentioned above, so that the adjoining sheath wires do not directly contact with each other and hence the fatigue breakage hardly occurs in the sheath wires of the outermost sheath layer.

SUMMARY OF THE INVENTION

It is, therefore, an object of the invention to provide a pneumatic tire capable of improving bead portion durability by effectively controlling the fatigue breakage of the sheath wire in the second sheath layer from the outermost side.

According to a first aspect of the invention, there is the provision of a pneumatic tire having a bead portion provided therein with a bead core formed by helically winding plural thin-diameter sheath wires around a thick-diameter core wire to form a sheath layer and laminating a plurality of such sheath layers one upon the other, wherein an end count of sheath wires in an outermost sheath layer is made smaller than an imaginary end count of sheath wires in the outermost sheath layer at a close-packed state.

According to a second aspect of the invention, there is the provision of a pneumatic tire having a bead portion provided therein with a bead core formed by helically winding plural thin-diameter sheath wires around a thick-diameter core wire to form a sheath layer and laminating a plurality of such sheath layers one upon the other, wherein a periphery of each sheath wire constituting a second sheath layer from an outermost side is previously covered with a coating rubber.

When an end count of sheath wires in an outermost sheath layer is made smaller than an imaginary end count of sheath wires in the outermost sheath layer at a close-packed state as defined in the first aspect of the invention, a sum of gaps existing between the sheath wires in the outermost sheath layer is wider only by product of reduced end count and diameter of sheath wire than a sum of gaps existing between sheath wires at the imaginary close-pack state (which is larger than zero but smaller than the diameter of the sheath wire as previously mentioned), and hence the gap between the adjoining sheath wires is widened. When the vulcanization of the pneumatic tire is conducted at such a state, rubber easily flows inward up to the periphery of the sheath wire in the second sheath layer through the widened gap between the adjoining sheath wires of the outermost sheath layer in the radial direction. For example, when one sheath wire is decreased from the end count at the imaginary close-packed state, rubber covers full periphery of each of the sheath wires in the second sheath layer and flows inward into a third sheath layer in the radial direction so as to partly cover an outward portion of a sheath wire in the third sheath layer in the radial direction. Thus, fretting due to direct contact between adjoining sheath wires in the second sheath layer is prevented and hence the fatigue breakage of such a sheath wire is effectively controlled.

Further, when the periphery of each sheath wire constituting the second sheath layer from the outermost side is previously covered with the coating rubber as defined in the second aspect of the invention, the direct contact between the adjoining sheath wires in the second sheath layer is suppressed by the coating rubber to prevent the fretting, and hence the fatigue breakage of such a sheath wire is effectively controlled.

In a preferable embodiment of the first aspect, the end count of the sheath wires in the outermost sheath layer is not less than 0.8 times the end count at the imaginary close-packed state, whereby the fatigue breakage of the sheath wire can effectively be controlled without lowering the strength of the bead core.

In another preferable embodiment of the first aspect, an end count of sheath wires in a sheath layer(s) existing between outermost sheath layer and innermost sheath layer is made smaller than an imaginary end count of sheath wires in this sheath layer at a close-packed state, whereby the fatigue breakage of the sheath wire in second and on sheath layers from the outermost side can be controlled.

In a preferable embodiment of the second aspect, the coating rubber has a thickness of from 0.2 mm to 0.2 times a diameter of the sheath wire, whereby the fatigue breakage of the sheath wire can be controlled without increasing weight.

BRIEF DESCRIPTION OF THE DRAWINGS

The invention will be described with reference to the accompanying drawings, wherein.

DESCRIPTION OF PREFERRED EMBODIMENTS

Figure 1:
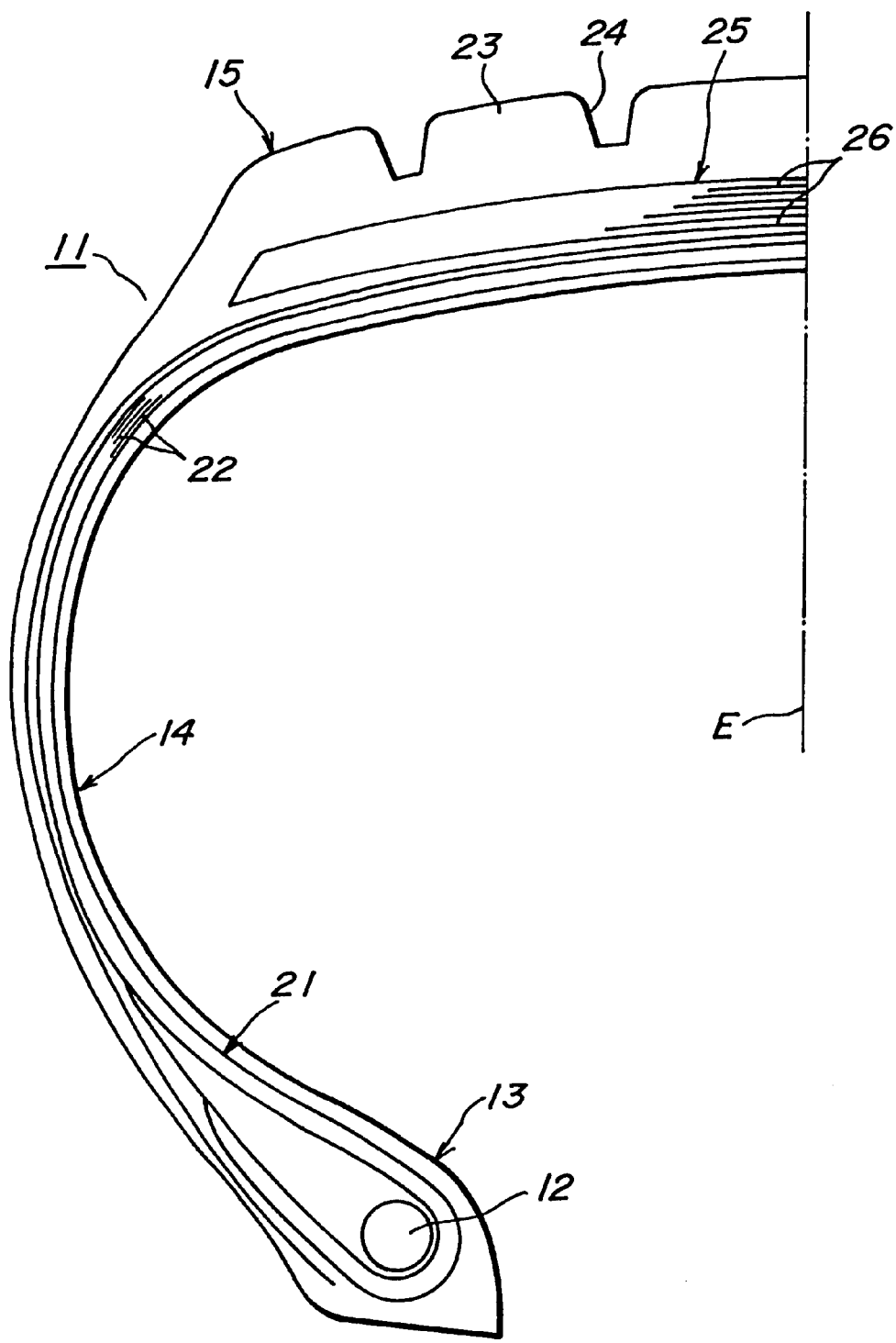
FIG. 1 is a left-half radial section view of an embodiment of the pneumatic tire according to a first aspect of the invention.

A first embodiment of the invention will be described with reference to FIGS. 1–3. In FIG. 1 numeral 11 is a pneumatic radial tire for use in an airplane, which comprises a pair of bead portions 13 each containing a bead core 12 of a circular section therein, a sidewall portion 14 extending substantially outward from each of the bead portions 13 in a radial direction of the tire, and a tread portion 15 of a substantially hollow cylindrical shape connecting outer ends of the sidewall portions in the radial direction to each other. Also, the tire 11 is reinforced with a carcass 21 toroidally extending from one of the bead portions 13 to the other bead portion and comprised of plural carcass plies 22 laid one upon the other. A greater part of these carcass plies 22 are wound around each of the bead cores 12 from inside toward outside to form turnup portions thereof, while a carcass ply(s) 22 particularly located outward in the radial direction among the carcass plies 22 extends downward up to the bead core 12 along the outside of the turnup portion. In each of the carcass plies 22 are embedded many cords made from textile fiber or the like extending substantially in a direction to an equatorial plane E of the tire (extending in a radial direction). A tread rubber 23 is arranged at the outside of the carcass 21 in the radial direction, and plural circumferential groove 24 and a plurality of lateral grooves (not shown) crossing the circumferential grooves 24 are formed on the outer surface of the tread rubber 23. A belt 25 is disposed between the carcass 21 and the tread rubber 23 and comprised of plural belt layers 26 laid one upon the other. In each of these belt layers 26 are embedded many cords made from textile fiber or the like extending obliquely with respect to the equatorial plane E, or is embedded a cord helically wound so as to extend substantially in parallel to the equatorial plane B.

Figure 2:
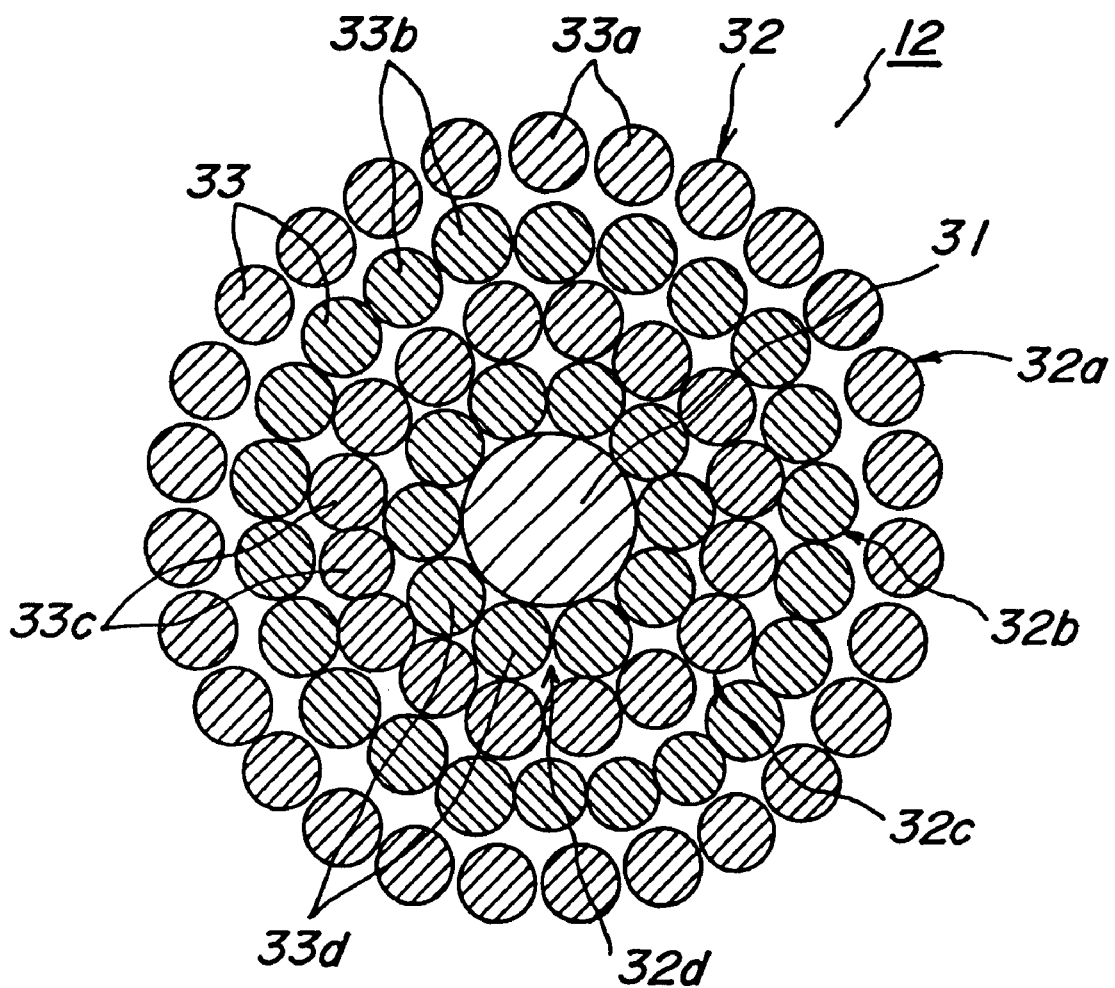
FIG. 2 is a section view of a bead core used in the embodiment of FIG. 1.
Figure 3:
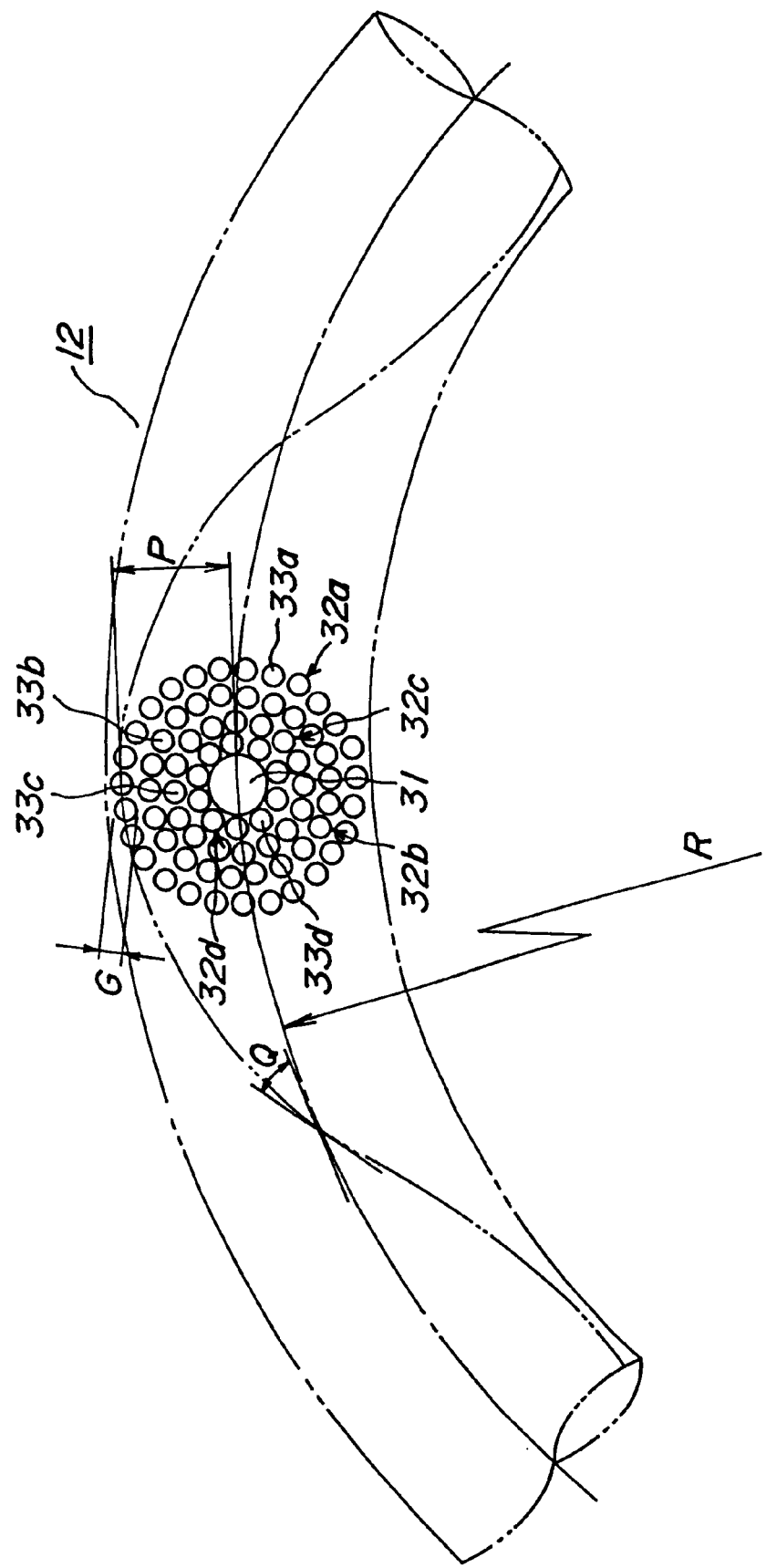
FIG. 3 is a partly schematic view illustrating the section of the bead core shown in FIG. 2 in relation with a shape of a side face thereof.

As shown in FIGS. 2 and 3, each of the bead cores 12 has a ring-shaped thick-diameter core wire 31 made from a bare steel wire (not covered with rubber). Numeral 32 is a sheath layer laminated on the core wire 31. In the illustrated embodiment, the bead core 12 comprises four sheath layers 32 laminated on the core wire. Each of these sheath layers 32 is constructed by helically winding plural sheath wires 33 having a diameter thinner than that of the core wire 31 around the core wire or an adjoining sheath layer, in which a winding direction of the sheath wire 33 constituting the sheath layer 32 is opposite to that of the adjoining sheath layer. Also, the sheath wire 33 in each sheath layer 32 is made from a bare steel wire likewise the core wire 31. The end count of sheath wires 33 in each of the sheath layers 32 becomes large outward in the radial direction because the circumferential length of the sheath layer 32 becomes long outward in the radial direction. In the illustrated embodiment, the end counts of sheath wires $33b$, $33c$, $33d$ in second, third and fourth sheath layers $32b$, $32c$, $32d$ from the outermost side are the same as those at a close-packed state likewise the conventional technique, while the end count of sheath wires $33a$ in the outermost sheath layer $32a$ is made smaller than the end count at a close-packed state in the sheath layer $32a$. Moreover, the term "closepacked state" used herein means a state of embedding a maximum number of sheath wires 33 in the sheath layer 32. The end count of sheath wires 33 in the sheath layer 32 at the close-packed state can be determined as a maximum integer value of end count satisfying the following two equations.

$$\cos Q = \cot(\pi/M)/\{(2P/G)^2 1\}^{1/2}$$

$$\tan Q = N \times P/R$$

wherein M is an end count of sheath wires 33 in a sheath layer 32, N is number of pitches of the sheath wire 33 in the sheath layer 32 and a positive integer of 3 or more, P is a radius of curvature of the sheath wire 33 in the sheath layer 32 from a center of the core wire 31, G is a diameter of the sheath wire 33 in the sheath layer 32, R is a radius of curvature of the core wire 31 from a center of the tire, and Q is a winding angle of the sheath wire 33 in the sheath layer 32 with respect to the core wire 31 (helical angle). For example, in the bead core 12 wherein a radius of curvature R of the core wire 31 is 276.7 mm, diameters G1, G2, G3, G4 of the sheath wires $33a$, $33b$, $33c$, $33d$ in the first, second, third and fourth sheath layers $32a$, $32b$, $32c$, $32d$ from the outermost side are 2.2 mm, and pitch numbers N1, N2, N3, N4 are 5, 5, 6 and 6, if radii of curvature P1, P2, P3, P4 of the sheath wires $33a$, $33b$, $33c$, $33d$ are 10.2, 8.0, 5.8 and 3.6 mm, respectively, end counts of sheath wires $33a$, $33b$, $33c$, $33d$ in the first, second, third and fourth sheath layers $32a$, $32b$, $32c$ and $32d$ at their close-packed states are 28, 22, 16 and 10, respectively.

When the end count of the sheath wires $33a$ in the outermost sheath layer $32a$ is made smaller than the end count thereof at the close-packed state, the sum of gaps existing between the sheath wires $33a$ in the outermost sheath layer $32a$ is wider by product of diameter G1 of the sheath wire $33a$ and reduced end count than the sum of gaps existing between sheath wires in the outermost sheath layer at the close-packed state (which is larger than zero but smaller than the diameter G1 of the sheath wire), and hence the gap between the adjoining sheath wires $33a$ in the outermost sheath layer $32a$ is widened. When the vulcanization of the tire 11 is conducted at such a state, rubber disposed around the bead core 12 easily flows inward up to the periphery of the sheath wire 33b in the second sheath layer 32b through the widened gap between the adjoining sheath wires 33a of the outermost sheath layer 32a in the radial direction. For example, when one sheath wire is decreased from the end count at the close-packed state in the outermost sheath layer, rubber covers full periphery of each of the sheath wires 33b in the second sheath layer 32b and flows inward into a third sheath layer 32c in the radial direction so as to partly cover an outward portion of a sheath wire 33c in the third sheath layer in the radial direction. Thus, fretting due to direct contact between adjoining sheath wires 33b in the second sheath layer 32b is prevented and hence the fatigue breakage of such a sheath wire 33b is effectively controlled. Moreover, when the adjoining sheath wires 33c or 33d in the third or fourth sheath layer 32c or 32d are opposite to each other at a bare state, these wires directly contact with each other to cause fretting, but there is caused no problem on the fatigue breakage because the deformation quantity produced in the sheath wire 33c, 33d of the third and fourth sheath layers 32c, 32d is a relatively small value.

As the number of the sheath wires 33a in the outermost sheath layer 32a becomes reduced, rubber more flows into inner sheath layers in the radial direction to increase the sheath wires 33 covered with rubber. When the reducing number is 0.2 times of the end count of the sheath wires 33a at the close-packed state, all of the sheath wires 33c in the third sheath layer 32c are covered with rubber over a full periphery. However, when the reducing number is more than 0.2 times, or when the end count of the sheath wires 33a in the outermost sheath layer 32a is less than 0.8 times the end count of the sheath wires at the close-packed state, the flowing of rubber inward from the third sheath layer 32c in the radial direction is not caused and the effect is saturated and rather the strength of the bead core 12 is considerably lowered. For this end, it is favorable that the end count of the sheath wires 33a in the outermost sheath layer 32a is not less than 0.8 times the end count of the sheath wires 33a at the close-packed state.

If the fatigue breakage is caused in the sheath wires 33c, 33d of the sheath layers after the second sheath layer 32b or the third and fourth sheath layers 32c, 32d (the illustrated embodiment), it is sufficient that in order to suppress such a fatigue breakage, the end count of the sheath wires 33b, 33c in the second and third sheath layers 32b, 32c existing between the outermost sheath layer 32a and the innermost (fourth) sheath layer 32d is made smaller than the end count of the sheath wires 33b, 33c in the sheath layers 32b, 32c at the close-packed state. In this case, rubber further flows inward in the radial direction into the sheath layers 32 or third and fourth sheath layers 32c, 32d to effectively control the fatigue breakage of the sheath wires 33c, 33d.

Figure 4:
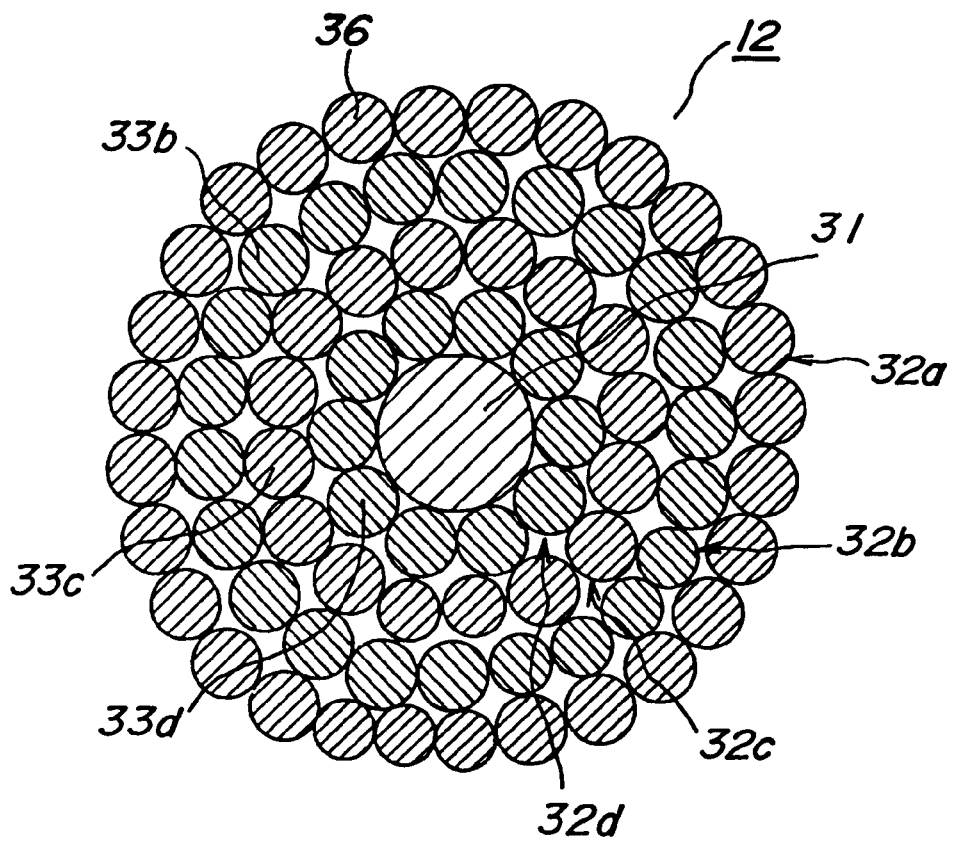
FIG. 4 is a section view of a bead core according to a second aspect of the invention.
Figure 5:
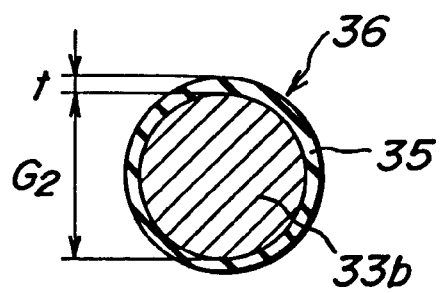
FIG. 5 is a section view of a sheath wire used in the bead core of FIG. 4.

In FIGS. 4 and 5 is shown a second embodiment of the invention. In this embodiment, the end count of the sheath wires (33a, 33b, 33c, 33d) in all sheath layers 32a, 32b, 32c, 32d is the same as the end count at the close-packed state likewise the conventional technique, but each of the sheath wires 33b constituting the second sheath layer 32b from the outermost side is rendered into a rubberized wire 36 by previously covering a periphery of the sheath wire with a coating rubber 35 prior to the winding. When the rubberized wire 36 is used in the second sheath layer 32b, even if the tire 11 is run at a high speed under a heavy load, the direct contact between the adjoining sheath wires 33b in the second sheath layer 32b is interrupted by the coating rubber 35 to prevent the fretting, whereby the fatigue breakage of the sheath wires 33b is effectively controlled.

In this case, it is preferable that a thickness t of the coating rubber 35 is within a range of from 0.2 mm to 0.2 times diameter G2 of the sheath wire 33b. When the thickness is less than 0.2 mm, it is difficult to cover the periphery of the sheath wire 33b with the coating rubber at a uniform thickness, while when it exceeds 0.2 times the diameter G2 of the sheath wire 33b, the effect of controlling the fatigue breakage is saturated, while the weight is unfavorably increased. Furthermore, it is possible to use the rubberized wire 36 in all of the sheath layers 32a, 32b, 32c and 32d. In the latter case, the direct contact between the adjoining sheath wires 33 in any sheath layers 32 can be prevented to effectively control the fatigue breakage of these sheath wires 33. Although the end count of the sheath wires 33 in all of the sheath layers 32 is the same as the end count at the close-packed state in this embodiment, the end count of the sheath wires 33a in at least an outermost sheath layer 32a may be made smaller than the end count at the close-packed state likewise the above first embodiment.

The following examples are given in illustration of the invention and are not intended as limitations thereof.

EXAMPLE 1

There are provided a conventional tire 1 having a bead core in which an end count of sheath wires in an outermost sheath layer is the same as an end count at a close-packed state or is 28 wires, and an invention tire 1 having a bead core as shown in FIG. 2 in which an end count of sheath wires in an outermost sheath layer is 27 wires by reducing one sheath wire from the end count at the close-packed state. These tires have a tire size of APR46×17R20/30PR. In each of these tires, end counts of sheath wires in second, third and fourth sheath layers from the outermost side are the same as the end count of the respective sheath layer at the close-packed state or 22 wires, 16 wires and 10 wires, respectively.

Then, each of the tires is inflated under an internal pressure of 17.1 kgf/cm$^2$ and mounted onto a rim (45×16-20) and run on a drum testing machine at a speed of 64 km/h under a load of 16700 kgf for 10 minutes hourly and then such a running test is repeated 800 times. A sheath wire in the second sheath layer is taken out at a length of about 30 cm from the bead core of each of new tire and tested tire and set onto a tension testing machine to measure a strength at break of such a sheath wire. When the strength at break in the new tire is 100 as an index, the strength at break of the conventional tire 1 after the test is 97.5, while that of the invention tire 1 after the test is 99.5.

EXAMPLE 2

There are provided a conventional tire 2 having a bead core in which sheath wires in all sheath layers are bare wires (not covered with rubber), and an invention tire 2 having a bead core as shown in FIG. 4 in which sheath wires in all sheath layers are covered with rubber at a thickness of 0.44 mm. In any bead core of these tires, the end count of sheath wires in all sheath layers is the same as the end count at the close-packed state. These tires have a tire size of APR46×17R20/30PR.

The strength at break in the sheath wire of the second sheath layer is measured in the same manner as in Example 1. As a result, when the strength at break in the new tire is 100 as an index, the strength at break of the conventional tire 2 after the test is 97.5, while that of the invention tire 2 after the test is 99.5.

As mentioned above, according to the invention, the fatigue breakage of the sheath wire in the second sheath layer from the outermost side can effectively be controlled to improve the bead portion durability of the pneumatic tire.

What is claimed is:

1. A pneumatic tire having a bead portion provided therein with a bead core formed by helically winding plural thin-diameter sheath wires around a thick-diameter core wire to form a sheath layer and laminating a plurality of such sheath layers one upon the other, wherein a periphery of each sheath wire constituting a second sheath layer from an outermost side is previously covered with a coating rubber, wherein the coating rubber has a thickness of from 0.2 mm to 0.2 times a diameter of the sheath wire.

2. A pneumatic tire according to claim 1, wherein the covering with the coating rubber is conducted prior to the winding.

* * * * *